(12) United States Patent
Anegawa et al.

(10) Patent No.: US 9,452,788 B2
(45) Date of Patent: Sep. 27, 2016

(54) TOP PART STRUCTURE OF VEHICLE BODY

(71) Applicant: HONDA MOTOR CO., LTD., Tokyo (JP)

(72) Inventors: Shota Anegawa, Saitama (JP); Yukihiko Nagai, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/890,979

(22) PCT Filed: Mar. 25, 2014

(86) PCT No.: PCT/JP2014/058330
§ 371 (c)(1),
(2) Date: Nov. 13, 2015

(87) PCT Pub. No.: WO2014/185154
PCT Pub. Date: Nov. 20, 2014

(65) Prior Publication Data
US 2016/0083018 A1    Mar. 24, 2016

(30) Foreign Application Priority Data
May 17, 2013    (JP) .................... 2013-104721

(51) Int. Cl.
*B62D 25/06* (2006.01)
*B62D 25/04* (2006.01)
*B62D 27/02* (2006.01)

(52) U.S. Cl.
CPC ............... *B62D 25/06* (2013.01); *B62D 25/04* (2013.01); *B62D 27/02* (2013.01)

(58) Field of Classification Search
CPC ....... B62D 25/04; B62D 25/06; B62D 27/02
USPC ................ 296/193.12, 193.06, 30, 210
See application file for complete search history.

(56) References Cited

U.S. PATENT DOCUMENTS

| 4,470,619 A * | 9/1984 | Imajyo ............. B60R 22/24 280/808 |
| 8,944,494 B2 * | 2/2015 | Nakamura ......... B62D 25/04 296/187.12 |
| 2013/0049405 A1 | 2/2013 | Kurogi et al. |

(Continued)

FOREIGN PATENT DOCUMENTS

JP    2006-327399    12/2006

OTHER PUBLICATIONS

International Search Report, Date of mailing: Jun. 17, 2014.

*Primary Examiner* — Jason S Morrow
(74) *Attorney, Agent, or Firm* — Rankin, Hill & Clark LLP (57) ABSTRACT

Provided is a top part structure of a vehicle body provided with: a roof side rail extending in a front-rear direction on a side part of the vehicle body, the roof side rail being formed by a rail inner, a rail outer joined to a vehicle outer side of the rail inner to form a cross-section, and a rail stiffener sandwiched between the rail inner and the rail outer to partition the closed cross-section; and a pillar extending downward from the roof side rail, the top part structure including: a bulkhead joined, at an intersection portion between the pillar and the roof side rail, to the rail stiffener, fastened by a bolt to the rail inner, and disposed such as to partition the closed cross-section between the rail inner and the rail stiffener.

8 Claims, 8 Drawing Sheets

(56) References Cited

U.S. PATENT DOCUMENTS

| | | | |
|---|---|---|---|
| 2013/0278023 A1* | 10/2013 | Nakayama | B62D 25/06 296/203.03 |
| 2014/0138988 A1* | 5/2014 | Kisaku | B62D 25/02 296/210 |
| 2014/0225399 A1* | 8/2014 | Ono | B62D 25/06 296/210 |
| 2014/0312656 A1* | 10/2014 | Gim | B62D 25/06 296/210 |
| 2015/0367794 A1* | 12/2015 | Nishimura | B60R 19/023 296/187.13 |

\* cited by examiner

TOP PART STRUCTURE OF VEHICLE BODY

TECHNICAL FIELD

The present invention relates to a top part structure of a vehicle body of an automobile or the like.

BACKGROUND ART

In general, a top part of a vehicle body of an automobile is provided with a roof panel; a plurality of roof rails extending on the lower surface of the roof panel and in the vehicle transverse direction and holding the roof panel; roof side rails joined to the both end portions of the roof rails and extending in the vehicle body front-rear direction of the vehicle body; and pillars, whose upper end portions are joined to the roof side rails, extending downward.

As a conventional structure for a top part of a vehicle body, for example, a roof structure for a vehicle body is known, which is disclosed by Patent Literature 1. In this roof structure of a vehicle body, welded are an outer panel forming a recessed portion in a vertical cross-sectional view by a roof panel; an inner panel joined to the vehicle inner side of the outer panel to form a closed cross-section; a stiffener forming a closed cross-section between the outer panel and the inner panel; and a reinforcing member (a bulkhead portion), whose cross section is substantially U-shaped, joined to the vehicle inner side of the stiffener to form a closed cross-section. Thus, the stiffness of the joint portion between the roof side rails and the roof rails are increased.

This reinforcing member is disposed on the lower side of a recessed portion formed on the roof panel through the opening formed between the substantially U-shaped cross-section of an extending piece and the lower surface of the stiffener. The reinforcing member is welded at one end thereof to the extending piece, and the bulkhead portion of the other end is welded to the inner lower surface of the inner panel.

RELATED ART DOCUMENT

Patent Literature

Patent Literature 1: JP 2006-327399 A (see FIG. 4 and FIG. 5)

DISCLOSURE OF THE INVENTION

Problems to be Solved by the Invention

However, although, in the top part structure of a vehicle body (a roof structure) disclosed in Patent Literature 1, the reinforcing member is provided at the joint portion between the roof side rail and the roof rail to increase the stiffness of the joint portion, the stiffness and the strength may be decreased because an opening is formed through which the reinforcing member passes the stiffener.

Further, in case of fastening a bulkhead to a rail stiffener by a bolt, a nut is fastened to the vehicle outer side surface of the rail stiffener, a clearance is accordingly necessary to arrange the nut between the rail stiffener and the rail outer.

In order to set the clearance, it is necessary to make the cross-section of the rail outer large or make the cross section of the rail stiffener small. In case of making the cross-section of the rail outer large, as the rail outer is a component forming a design surface, there is a problem that the design is affected.

On the other hand, in case of making the cross-section of the rail stiffener small, as the cross-sectional shape of the rail stiffener is made small, there is a problem that the stiffness and the strength of the roof side rail decreases.

In this situation, a structure for a top part of a vehicle body, the structure having roof side rails with further increased stiffness and strength, has been desired.

In this situation, the present invention has been developed to solve the above-described problems, and an object of the present invention is to provide a structure for a top part of a vehicle body, the structure having an increased stiffness and strength of a roof side rail.

Means for Solving the Problems

In order to solve the above-described problems, in claim 1, described is a top part structure of a vehicle body provided with: a roof side rail extending in a front-rear direction on a side part of the vehicle body, the roof side rail being formed by a rail inner, a rail outer joined to a vehicle outer side of the rail inner to form a closed cross-section, and a rail stiffener sandwiched between the rail inner and the rail outer to partition the closed cross-section; and a pillar extending downward from the roof side rail, the top part structure of a vehicle body including: a bulkhead joined, at an intersection portion between the pillar and the roof side rail, to the rail stiffener, fastened by a bolt to the rail inner, and disposed such as to partition the closed cross-section between the rail inner and the rail stiffener.

According to the above structure, in the top part structure of a vehicle body, the bulkhead is joined to the rail stiffener and fastened to the rail inner by a bolt at the intersection portion between the pillar and the roof side rail. Thus, without providing an opening as in a conventional technology disclosed in the above-described Patent Document 1, it is possible to join the bulkhead to both the rail stiffener on the vehicle outer side in the vehicle transverse direction and the rail inner on the vehicle inner side. Further, as the bulkhead is arranged such as to partition the closed cross-section between the rail inner and the rail stiffener, it is possible to increase the stiffness and the strength of the intersection portion between the pillar and the roof side rail. Further, the rail outer is joined to the rail inner without being fastened by a bolt, the appearance shape is not restricted, and it is accordingly possible to improve the designability of the rail outer.

Further, it is preferable that the bulkhead has a cap-shaped cross-section formed by: an inner side wall fastened to the rail inner; a front wall extending from a front end of the inner side wall to a vehicle outer side; a rear wall extending from a rear end of the inner side wall to the vehicle outer side; a first front flange extending forward from the front wall; and a first rear flange extending backward from the rear wall.

According to the above structure, the front wall and the rear wall of the bulkhead formed in a but shaped cross-section are disposed such as to extend and stretch in the vehicle transverse direction between the rail inner and the rail stiffener, and it is thereby possible to improve the stiffness and the strength of the roof side rail.

Still further, it is preferable that the rail stiffener has a U-shaped cross-section formed by: a stiffener upper wall formed at an upper portion of the rail stiffener; a stiffener vertical wall extending downward from an outer side end portion in a vehicle transverse direction of the stiffener upper wall; and a stiffener lower wall extending from a lower end of the stiffener vertical wall to a central side in the vehicle transverse direction, wherein the bulkhead includes: a second front flange extending forward from a lower end of the front wall and joined to the stiffener lower wall; and a second rear flange extending backward from a lower end of the rear wall and joined to the stiffener lower wall, and wherein the first front flange and the first rear flange are joined to the stiffener vertical wall.

According to the above structure, the bulkhead includes the second front flange joined to the stiffener lower wall and the second rear flange joined to the stiffener lower wall, and the first front flange and the first rear flange are joined to the stiffener vertical wall. Accordingly, as the rail inner and the bulkhead can be subjected not only to a so-called B-surface joining (joining between surfaces which are perpendicular to the vehicle body left-right direction axis) but also to H-surface joining (joining between surfaces which are perpendicular to the vehicle body upper-lower direction axis), and it is thereby possible to increase the stiffness and the strength.

Yet further, it is preferable that the rail stiffener is provided with cut-out portions on the stiffener upper wall thereof, at parts corresponding to the second front flange and the second rear flange, the cut-out portions enabling insertion of a spot gun.

According to the above structure, the rail stiffener is provided with cut-out portions at the parts corresponding to the second front flange and the second rear flange, the cut-out portions enabling insertion of a spot gun. It is thereby possible to perform not only B-surface joining but also H-surface joining between the roof side rail inner and the bulkhead.

5. Further, it is preferable that the bulkhead includes: a bulk upper wall extending from an upper end of the inner side wall to a vehicle transverse outer side; a third front flange extending backward from an upper end of the front wall and joined to the bulk upper wall; and a third rear flange extending forward from an upper end of the rear wall and joined to the bulk upper wall.

According to the above structure, the bulkhead includes the bulk upper wall, the third front flange extending backward from the upper end of the front wall and joined to the bulk upper wall, and the third rear flange extending forward from the upper end of the rear wall and joined to the bulk upper wall. It is thereby possible to increase the stiffness and the strength of the bulkhead itself.

Still further, it is preferable that the rail inner is divided front and rear in a front rail inner member and a rear rail inner member and includes a division joint portion at which a rear end of the front rail inner member and a front end of the rear rail inner member are joined, wherein the division joint portion is disposed at a position where the division joint portion is lapped with the bulkhead in the vehicle transverse direction.

According to the above structure, the division joint portion, at which the front rail inner member and the rear rail inner member are joined, is disposed, being lapped with the bulkhead. It is thereby possible to increase the stiffness and the strength of the division joint portion.

Yet further, it is preferable that the inner side wall of the bulkhead includes a depressed portion at a position at which the depressed portion is lapped with the division joint portion in the vehicle transverse direction, the depressed portion being in a shape depressed toward a vehicle outer side in the vehicle transverse direction.

According to the above structure, on the bulkhead, the front rail inner member and the rear rail inner member are arranged, being lapped to each other at a position at which the divisional joint portion and the bulkhead are lapped, and the bulkhead accordingly has a stepped shape at the position. By having the depressed portion depressed to the vehicle outer side in the vehicle transverse direction, the bulkhead can make the swelling of the stepped shape part absorbed. Accordingly, at the part at which the front rail inner member and the rear rail inner member are lapped, the rail inner does not swell to the vehicle transverse inner side, and it is possible to prevent effects to the joint with the pillar inner.

Further, it is preferable that the pillar includes a pillar inner whose upper end is attached to a vehicle inner side surface of the rail inner, wherein the pillar inner, the rail inner, and the bulkhead are fastened together by a bolt.

According to the above structure, the pillar inner, the rail inner, and the bulkhead are fastened together by a bolt, and it is thereby possible to increase the stiffness and the strength of the intersection portion between the pillar and the roof side rail.

Still further, it is preferable that the pillar includes a pillar stiffener whose upper end is attached to a vehicle outer side surface of the rail stiffener, wherein the bulkhead includes a spot gun insertion hole for spot joining of the rail stiffener and the pillar stiffener.

According to the above structure, for example, in a case of an assemble process in which the bulkhead is joined to the rail stiffener in advance and thereafter the pillar stiffener is lapped on the vehicle outer side surface of the rail stiffener, as the bulkhead is disposed at the intersection portion between the pillar and the roof side rail, the bulkhead obstructs joining of the rail stiffener and the pillar stiffener.

On the other hand, according to the present invention, as a spot gun insertion hole is formed through the bulkhead, the rail stiffener and the pillar stiffener can be joined. Accordingly, it is possible to improve the workability of the assembling work, and as the bulkhead is disposed at the intersection portion between the pillar and the roof side rail, it is also possible to improve the stiffness and the strength of the intersection portion.

Advantage of the Invention

By a top part structure of a vehicle body according to the present invention, it is possible to further improve the stiffness and the strength of a roof rail.

EMBODIMENT FOR CARRYING OUT THE INVENTION

A top part structure of a vehicle body in an embodiment according to the present invention will be described below, referring to FIGS. 1 to 9.

Incidentally, in the present embodiment according to the invention, "front" represents the front side of a vehicle C, "rear" represents the rear side of the vehicle C, "upper" represents the vertically upper side, and "lower" represents the vertically lower side.

<Structure of Vehicle>

First, before describing the top part structure of a vehicle body in the present embodiment according to the invention, the vehicle C, for which a top part structure of a vehicle body according to the invention is adopted, will be described.

Figure 1:
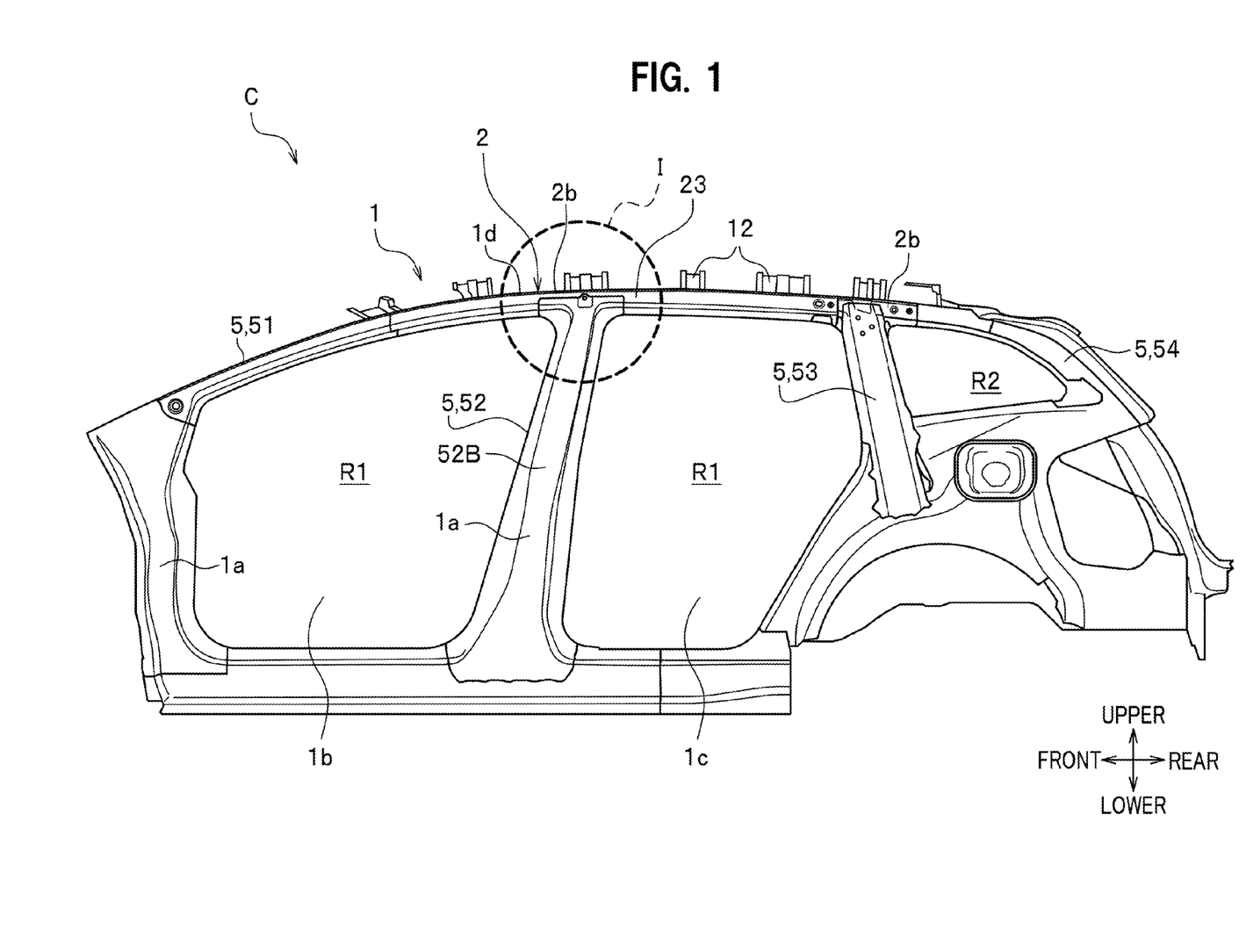
FIG. 1 is a schematic side view of the main part of a vehicle body showing an example of a top part structure a vehicle body in an embodiment of the present invention.

As shown in FIG. 1, the vehicle C is provided with roof side rails 2 arranged at the left and right end portions of roof rails 12 extending in the vehicle transverse direction and pillars 5 extending downward from the roof side rails 2. The kind, shape, and the like of the vehicle C are not particularly limited. That is, as long as the vehicle C is provided with roof side rails 2 and pillars 5 on a vehicle body 1, the vehicle C may be a passenger car, a bus, a truck, a work vehicle, or the like. In the following, a four door passenger vehicle will be described as an example of the vehicle C.

<Structure of Vehicle Body>

As shown 1, the vehicle body 1 includes frame members for forming the entirety of the vehicle C, and is provided with, for example, various metal vehicle body frames such as the roof side rails 2 described later and the like, a metal vehicle body panel such as a roof panel 11 (see FIG. 8), and the like. Each of vehicle body side parts 1a on the both sides of the vehicle body 1 is provided with a door opening portion 1b at a front seat and a door opening portion 1c at a rear seat.

Incidentally, as the vehicle body side parts 1a are formed substantially left-right symmetrically, the passenger seat (left side) will be mainly described, and description of the driver's seat (right side) will be omitted.

<Structure of Top Part of Vehicle Body>

As shown in FIG. 1, a vehicle body top part 1d is a top part of the entirety of the vehicle body 1 and is mainly configured by the roof panel 11 (see FIG. 18) constructing the portion of the roof of the vehicle body 1, and members constructing the frames near the left and side portions. The roof portion of the vehicle body 1 is provided with the above-described roof panel 11, the roof rails 12 under the roof panel 11, the roof side rails 2 provided at the both end portions in the vehicle transverse direction of the roof rails 12 and extending in the front-rear direction, and the pillars 5 extending downward from the roof rails 12.

<Structure of Pillar>

As shown in FIG. 1, the pillars 5 include, for example, front pillars 51, center pillars 52, quarter pillars 53, and rear pillars 54.

The front pillars 51 are posts provided on the left and the right of a front glass (not shown).

The center pillars 52 are posts provided between the door opening portions 1b and the door opening portions 1c.

The quarter pillars 53 are posts provided on the rear side of the door opening portions 1c.

The rear pillars 54 are posts provided from the upper portion of a luggage room R2 toward the rear end portion of the vehicle body 1.

<Structure of Roof Panel>

Figure 4:
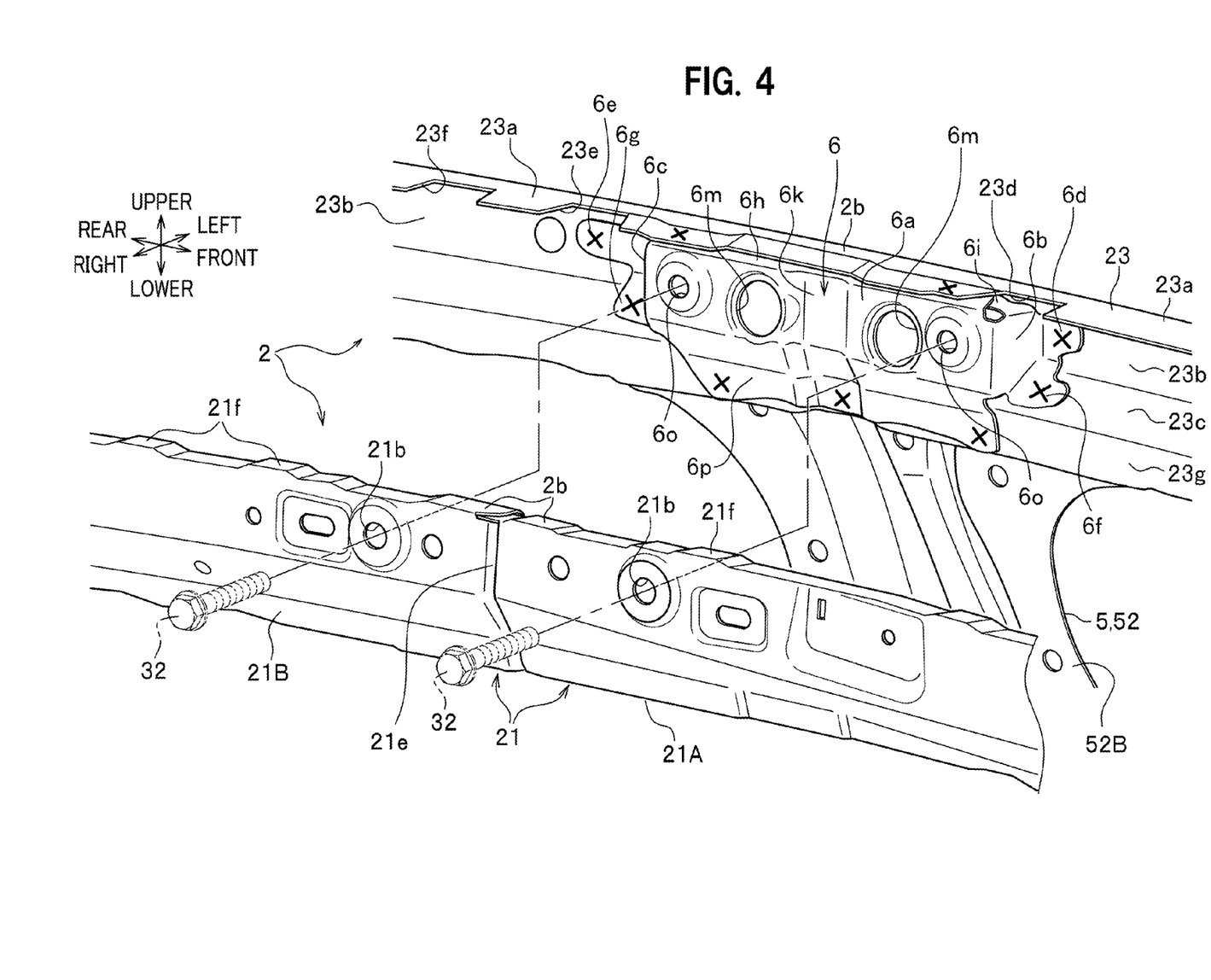
FIG. 4 is an exploded perspective view of a main part showing a fastened state between the bulkhead and the rail inner.
Figure 5:
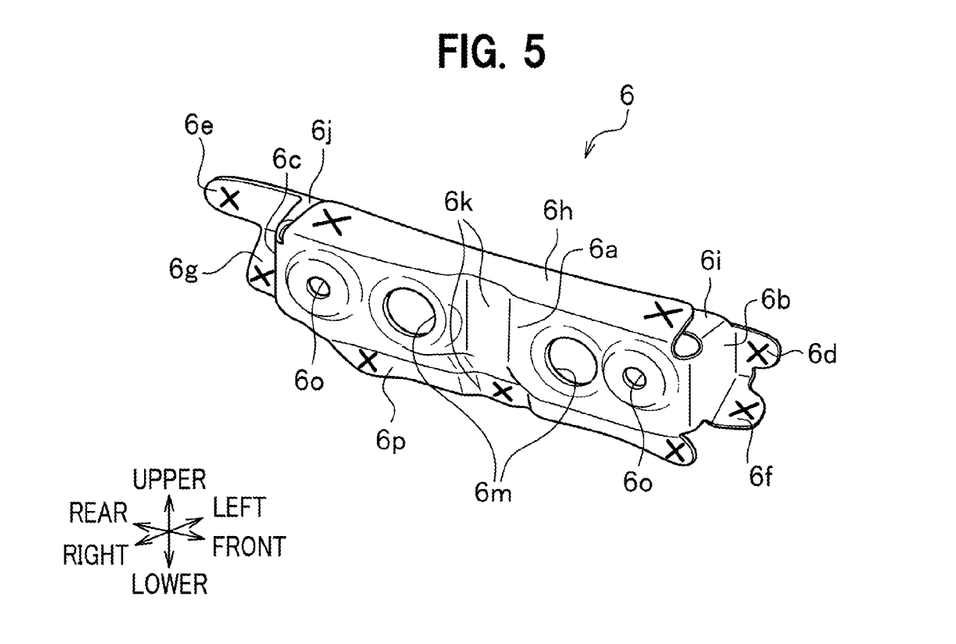
FIG. 5 is a perspective view of the bulkhead.
Figure 6:
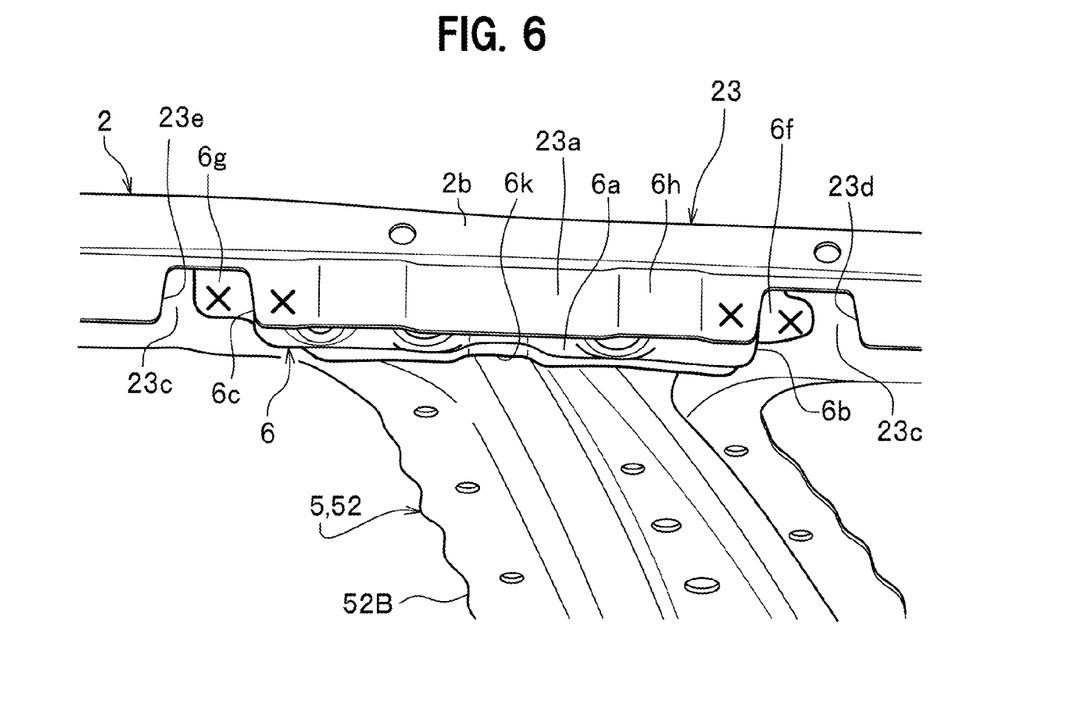
FIG. 6 is an enlarged plan view of a main part of the rail inner provided with the bulkhead.
Figure 7:
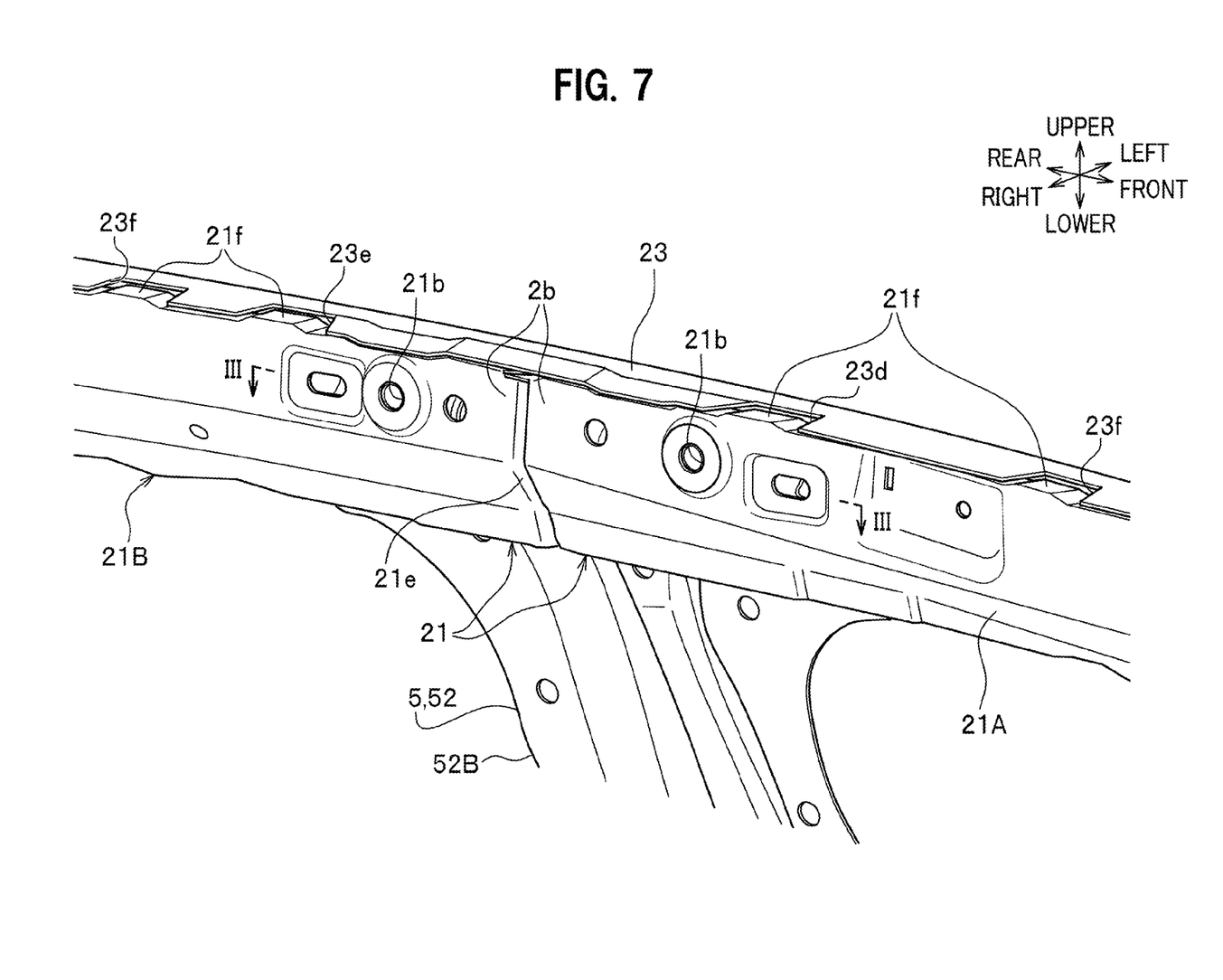
FIG. 7 is an enlarged perspective view of a main part of the rail inner arranged on the rail stiffener.
Figure 8:
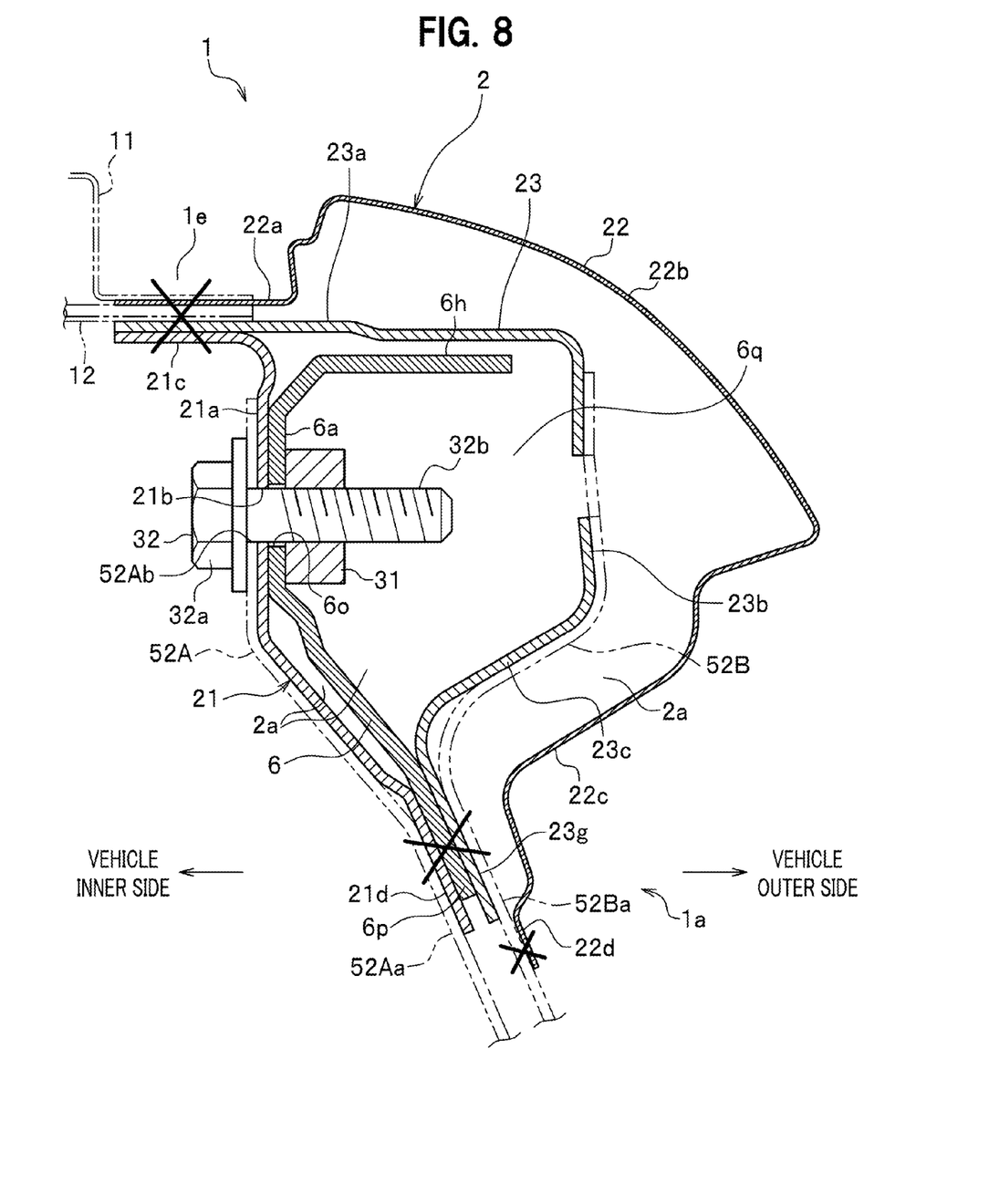
FIG. 8 is a cross-sectional view taken along II-II in FIG. 2.

As shown in FIG. 8, the roof panel 11 is a plate member forming the roof of the vehicle body 1 and is a metal plate such as a rolled steel plate or the like formed substantially in a rectangular shape in plan view. Each of the left and right end portions of the roof panel 11 forms a half portion of a recessed portion 1e bent in a recessed shape in front view. The roof panel 11 is arranged such that, at the bottom surface portion of the recessed portion 1e, the rail outer 22 of the roof side rail 2, the roof rail 12, and a rail inner 21 of the roof side rail 2 are lapped with each other and connected and fixed by spot welding. Incidentally, mark X in FIGS. 4 to 6 represents the welding portions.

<Structure of Roof Rail>

Figure 3:
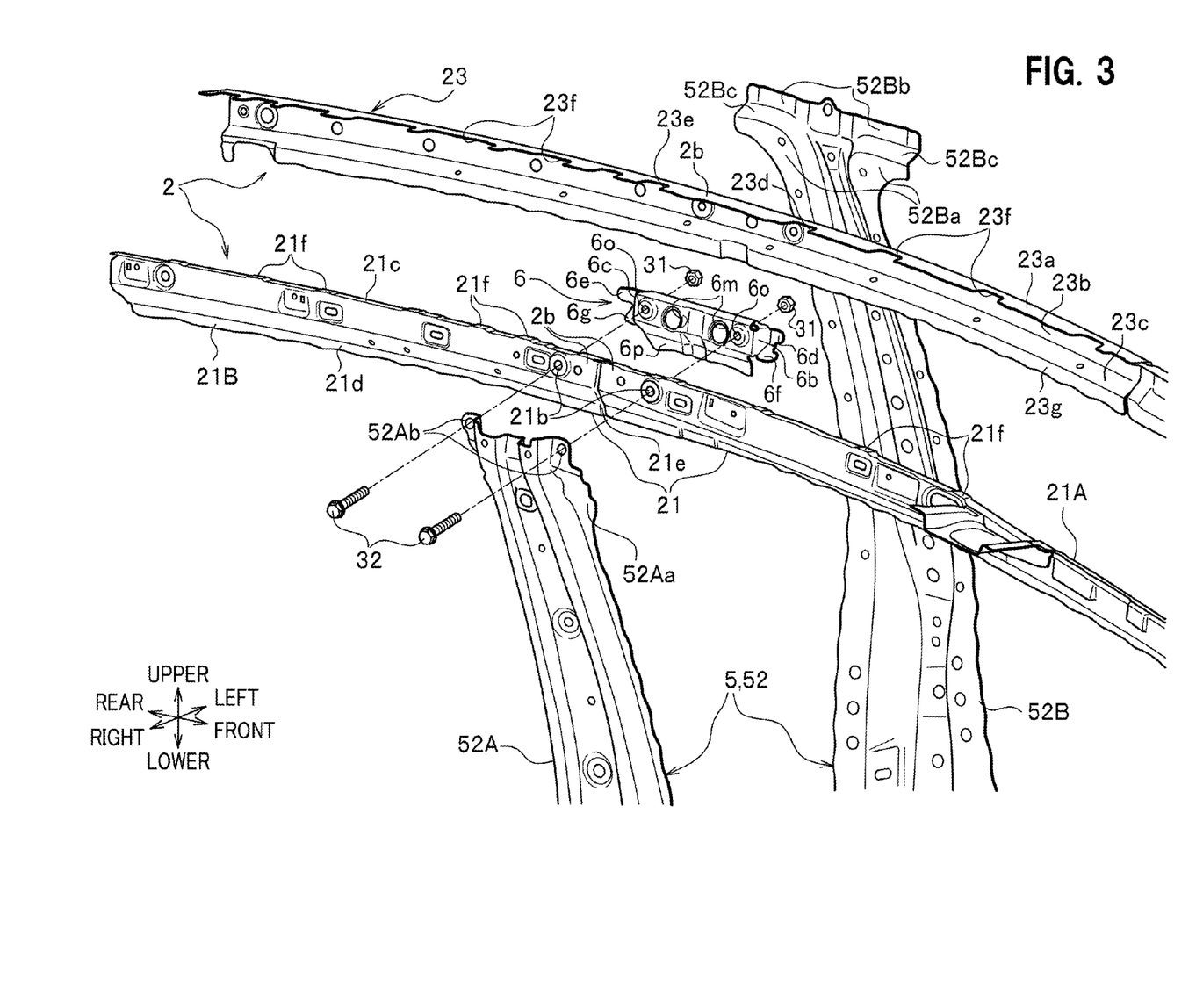
FIG. 3 is an exploded perspective view of a main part showing assembled state of a bulkhead.

As shown in FIG. 1, the roof rails 12 are members supporting the roof panel 11 (see FIG. 8) from the lower side and are arranged such as to bridge the left and right roof side rails 2, 2. A plurality of roof rails 12 are arranged from the front end portion to the rear end portion of the roof side rail 2 at appropriate intervals. As shown in FIG. 3, the left and right end portions of the roof rails 12 are sandwiched by the later-described rail inners 21 and the rail outers 22 (see FIG. 8).

<Structure of Roof Side Rail>

As shown in FIG. 1, the roof side rails 2 are frame members disposed, extending in the front-rear direction on the upper side of the vehicle body side portions 1a, and a plurality of pillars 5 is joined at the upper end portions thereof to the roof side rails 2, extending downward. The roof side rails 2 are members extending in the front-rear direction of the vehicle body, and form the door opening portions 1b, 1c, and the upper edge of the luggage room R2.

In the following, as an example of the present invention, the roof side rail 2 at the portion where the center pillar 52 (also referred to as "B pillar") is arranged will be described, wherein the center pillar 52 is disposed on the vehicle body side portion 1a of the vehicle body upper part 1d at the central portion on the left side of the vehicle C.

As shown in FIG. 3, the roof side rail 2 is configured by the rail inner 21 on the vehicle inner side, the rail outer 22 (see FIG. 8) joined to the vehicle outer side of the rail inner 21 to form a closed cross-section 2a (see FIG. 8), a rail stiffener 23 sandwiched between the rail inner 21 and the rail outer 22 to partition the closed cross-section 2a, a bulkhead 6 provided on the vehicle outer side of the rail inner 21, a nut 31 attached to the vehicle outer side of the rail stiffener 23, a bolt 32 fastened to the nut 31, and a pillar 5 (center pillar 52).

<Structure of Rail Inner>

As shown in FIG. 3, the rail inner 21 is a member extending in the front-rear direction perpendicular to the vehicle outer side of the upper end portion of a pillar inner 52A. As shown in FIG. 8, the rail inner 21 is a member for holding the roof panel 11 and the roof rail 12. As shown in FIG. 3 and FIG. 4, the rail inner 21 is formed by joining two members into one, the two members being a front rail inner member 21A and a rear rail inner member 21B divided along the front-rear direction.

As shown in FIG. 3 and FIG. 8, the rail inner 21 includes an inner side wall portion 21a vertically disposed on the vehicle inner side of the rail outer 22, a bolt insertion hole 21b formed through the inner side wall portion 21a, an inner upper flap portion 21c bent substantially horizontally toward the vehicle inner side from the upper portion of the inner side wall portion 21a, an inner lower flap portion 21d bent in an inclined state downward from the lower portion of the inner side wall portion 21a, a division joint portion 21e at which the rear end of the front rail inner member 21A and the front end of the rear rail inner member 21B are jointed, and protrusion portions 21f engaged with cut-out portions 23d-23f formed on the rail stiffener 23.

As shown in FIG. 8, the rail inner 21 is joined at the inner upper flap portion 21c of the upper end portion thereof to an outer upper flap portion 22a and a stiffener upper wall 23a, and joined at the inner lower flap portion 21d of the lower end portion thereof to the rail outer 22, to form a closed cross-section 2a with the rail outer 22 in a vertical cross-sectional view. The rail inner 21 is a half portion that forms a tubular frame member with the rail outer 22.

The head portion of the bolt 32 inserted in the bolt insertion hole 21b is disposed at the inner side wall portion 21a of the rail inner 21. Further, the upper end portion of the pillar inner 52A is joined to the vehicle inner side of the inner side wall portion 21a. The male screw portion 32b of the bolt 32 is inserted through the bolt insertion hole 6o of the bulkhead 6 to be screw-engaged to the nut 31.

As shown in FIG. 8, the inner upper flap portion 21c at the upper end portion is lapped by the stiffener upper wall 23a of the rail stiffener 23, the vehicle outer side end portion of the roof rail 12, the outer upper flap portion 22a of the rail outer 22, and the vehicle outer side end portion of the roof panel 11 to be integrally joined, and the inner bottom of the recessed portion 1e is thereby formed.

The inner lower flap portion 21d at the lower end portion is lapped by the flange upper end portion 52Aa of the pillar inner 52A, the lower flange 6p of the bulkhead 6, the lower flange 23g of the rail stiffener 23, and the flange upper end portion 52Ba of a pillar stiffener 52B to be integrally joined.

As shown in FIG. 3 and FIG. 4, the division joint portion 21e is disposed at a position lapping with the bulkhead 6 in the vehicle transverse direction.

The protrusion portions 21f are formed to be upward protruded at suitable positions on the inner upper flap portion 21c, and are formed by protrusions in a leg straddled trapezoidal shape in a side view formed such as to be matched with the respective cut-out portions 23d-23f of the rail stiffener 23.

<Structure of Rail Outer>

As shown in FIG. 8, the rail outer 22 is a member disposed on the outermost side of the roof side rail 2 to form the vehicle body outer-side part, and is extending in the vehicle body front-rear direction. The rail outer 22 includes an outer upper flap portion 22a arranged substantially horizontally to form the inner bottom portion of the recessed portion 1e, an upper inclined wall portion 22b bent with outward and downward inclination from the opening end of the recessed portion 1e, a lower inclined wall portion 22c bent with inward and downward inclination from the lower portion of the upper inclined wall portion 22b, and an outer lower flap portion 22d bent with outward and downward inclination from the lower portion of the lower inclined wall portion 22c.

The rail outer 22 and the rail inner 21 form the closed cross-section 2a. The pillar stiffener 52B, the rail stiffener 23, and the bulkhead 6 are arranged between the rail outer 22 and the rail inner 21.

The outer upper flap portion 22a is spot-welded in a state that the roof panel 11, the roof rail 12, the stiffener upper wall 23a, and the inner upper flap portion 21c are lapped at the recessed portion 1e. The outer lower flap portion 22d is spot-welded, being lapped with the flange upper end portion 52Ba of the pillar stiffener 52B.

<Structure of Rail Stiffener>

As shown in FIG. 8, the rail stiffener 23 is a member sandwiched between the rail inner 21 and the rail outer 22 to partition the closed cross-section 2a in the vehicle transverse direction. The rail stiffener 23 is formed by a rolled steel plate in a substantially U-shape in the vertical cross-sectional view and extending. The rail stiffener 23 is arranged perpendicular to the vehicle inner side of the upper end portion 52Bb (see FIG. 3) of the pillar stiffener 52B.

The rail stiffener 23 includes the stiffener upper wall 23a formed at the upper portion of the rail stiffener 23, a stiffener vertical wall 23b extending downward from the outer side end portion, in the vehicle transverse direction, of the stiffener upper wall 23a, a stiffener vertical wall 23b extending downward from the outer side end portion in the vehicle transverse direction of the stiffener upper wall 23a, a stiffener lower wall 23c extending toward the central side in the vehicle transverse direction from the lower end of the stiffener vertical wall 23b, cut-out portions 23d, 23e, and 23f (see FIG. 3) formed on the stiffener upper wall 23a, and a lower flange 23g (see FIG. 3) formed on the lower end edge portion of the rail stiffener 23.

As shown in FIG. 8, the stiffener upper wall 23a is a part that is horizontally bent on the upper side of the rail stiffener 23 that has a cross-section substantially in a U-shape. The bulkhead 6 is inserted under the stiffener upper wall 23a, and a bulk upper wall 6h is disposed such as to face the stiffener upper wall 23a. The vehicle inner side end portion of the stiffener upper wall 23a is disposed on the inner bottom of the recessed portion 1e to be joined to the inner upper flap portion 21c, the outer upper flap portion 22a, and the like.

The stiffener vertical wall 23b is disposed through the bulkhead 6, facing the inner side wall portion 21a of the rail inner 21.

The stiffener lower wall 23c is a lower side part of the rail stiffener 23, the stiffener lower wall 23c being bent substantially in a U-shape.

Figure 2:
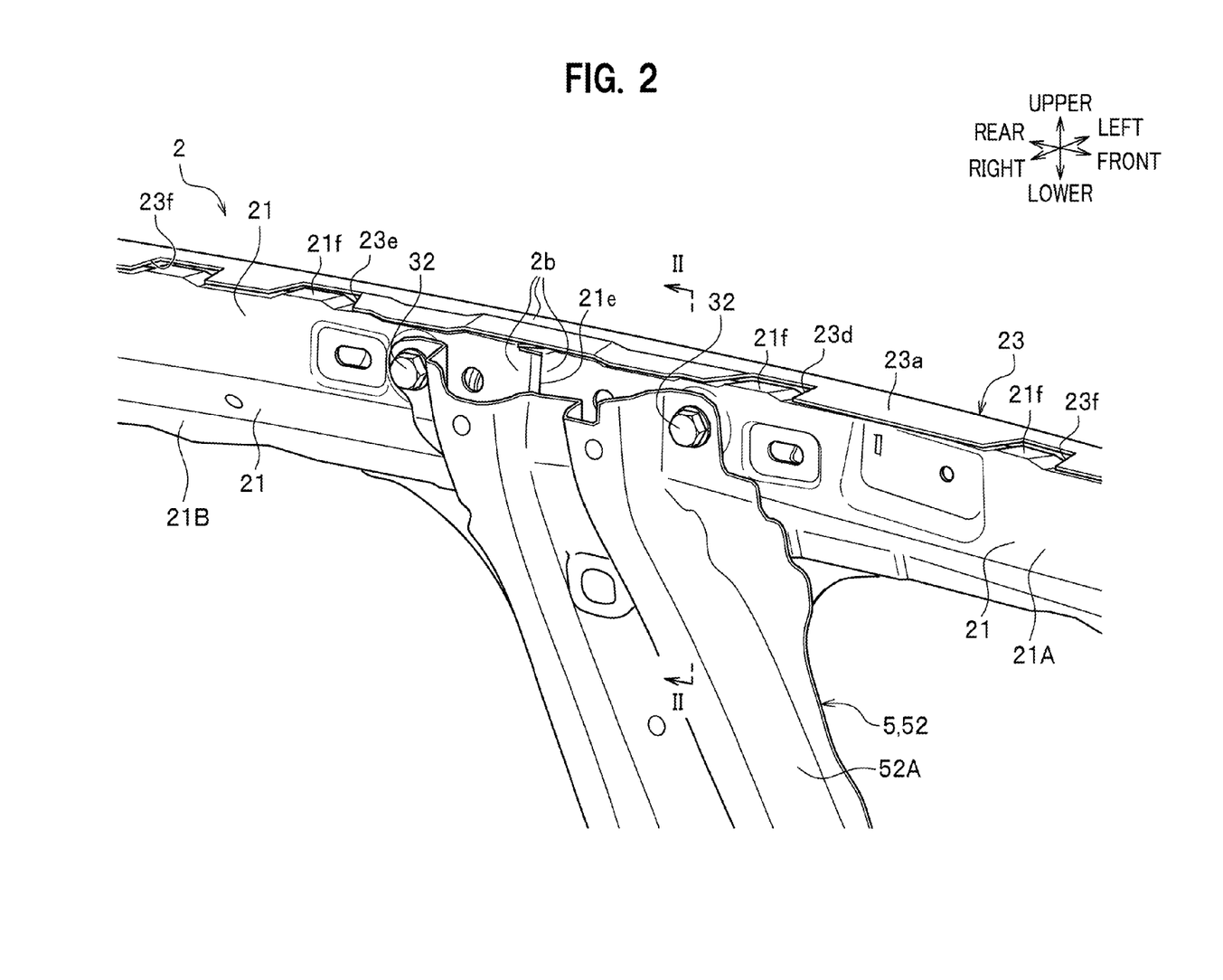
FIG. 2 is an enlarged perspective view of part I in FIG. 1.

As shown in FIG. 2 and FIG. 3, the stiffener upper wall 23a is provided with a number of cut-out portions 23d-23f at proper intervals to which the protrusion portions 21f are engaged. By engagement of the protrusion portions 21f with the cut-out portions 23d-23f, the rail inner 21 can be engaged at a certain position of the rail stiffener 23 so as not to be deviated in the front-rear direction nor in the left direction.

As shown in FIG. 4 and FIG. 6, the cut-out portions 23d, 23e, out of the cut-out portions 23d-23f, disposed at the upper portion of the bulkhead 6 also function as parts to insert a spot gun 7 (see FIG. 9) in spot-welding the second front flange 6f and the second rear flange 6g of the bulkhead 6 to the stiffener lower wall 23c of the rail stiffener 23. The cut-out portions 23d, 23e are formed substantially in a U-shape on the upper stiffener upper wall 23a where the second front flange 6f and the second rear flange 6g are arranged such that the spot gun 7 (see FIG. 9) can be inserted movably upward and downward, and thus spot welding is made possible.

<Structure of Bulkhead>

As shown in FIG. 3 and FIG. 4, the bulkhead 6 is a reinforcing member for reinforcing the division joint portion 21e of the rail inner 21.

As shown in FIG. 5, the bulkhead 6 is formed by integrating an inner side wall 6a, a front wall 6b, a rear wall 6c, a first front flange 6d, a first rear flange 6e, a second front flange 6f, a second rear flange 6g, a bulk upper wall 6h, a third front flange 6i, a third rear flange 6j, a depressed portion 6k, a spot gun insertion hole 6m, a but shaped cross-section 6n (see FIG. 9), a bolt insertion hole 6o, and a lower flange 6p, which will be described later.

Figure 9:
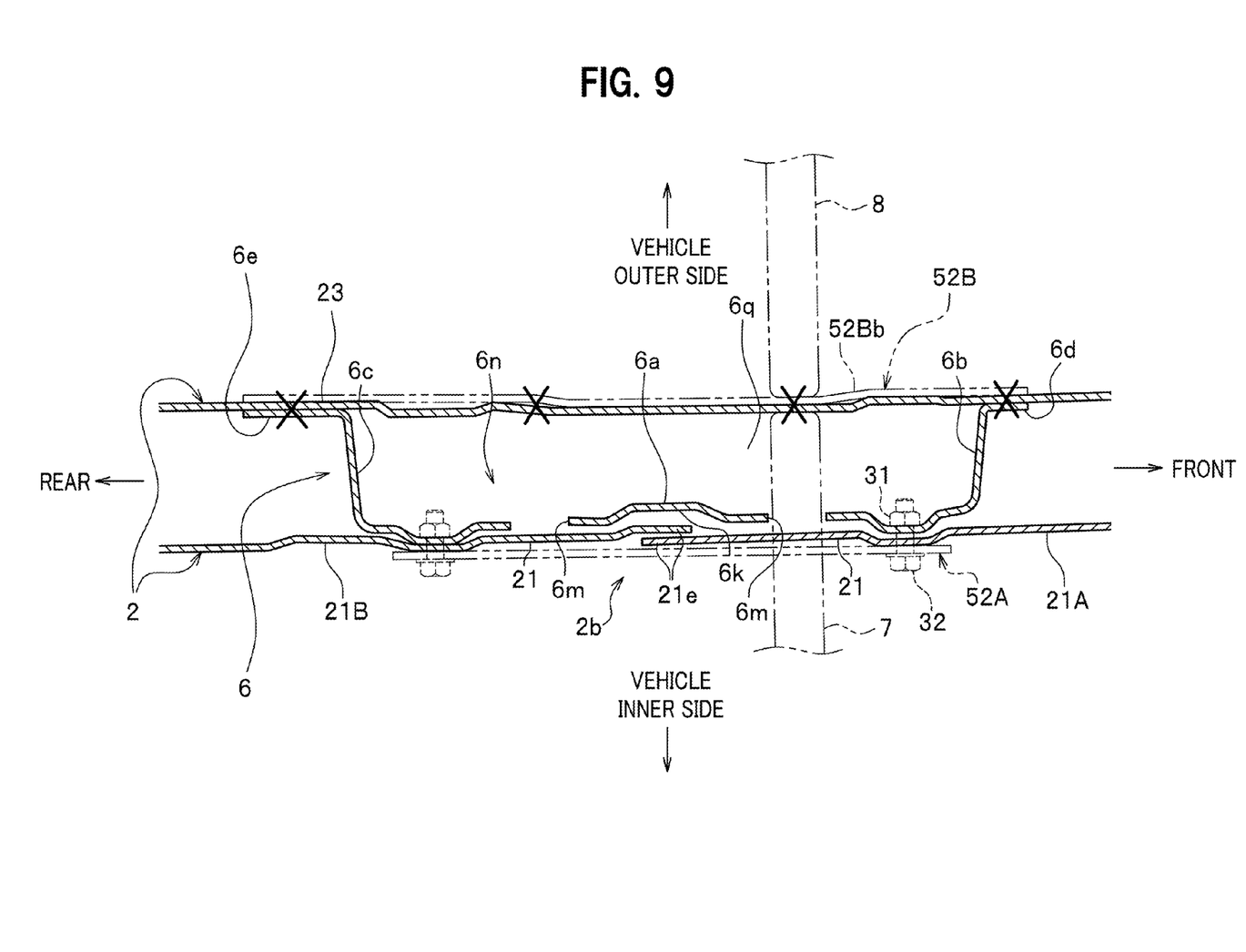
FIG. 9 is a cross-sectional view taken along III-III in FIG. 7.

As shown in FIG. 9, the but shaped cross-section 6n is formed by that the bulkhead 6 includes the inner side wall 6a fastened to the rail inner 21, the front wall 6b extending from the front end of the inner side wall 6a to the vehicle outer side, the rear wall 6c extending from the rear ends of the front wall 6b and the inner side wall 6a to the vehicle outer side, the first front flange 6d extending forward from the front wall 6b, and the first rear flange 6e extending backward from the rear wall 6c.

As shown in FIG. 4 and FIG. 9, the inner side wall 6a is a vertical wall forming the right-side side surface of the bulkhead 6 and is formed in a rectangular shape in a side view. The inner side wall 6a is provided with a depressed portion 6k at the central portion thereof, and is provided with spot gun insertion holes 6m and bolt insertion holes 6o both in a front-rear pair in the front side and the rear side of the depressed portion 6k. The division joint portions 21e between the front rail inner member 21A and the rear rail inner member 21B are disposed and fixed facing each other at the inner side wall 6a.

The front wall 6b is a wall forming the front side side-surface of the bulkhead 6 and is formed by leftward and vertically bending a flap extending forward from the inner side wall 6a. On the upper, lower, and left sides of the front wall 6b, the third front flange 6i, the second front flange 6f, and the first front flange 6d are formed.

The rear wall 6c is a wall forming the rear side side-surface of the bulkhead 6, and is formed by bending, toward the left direction and in the vertical direction, a flap extending reward from the inner side wall 6a. The third rear flange 6j, the second rear flange 6g, and the first rear flange 6e are formed on the upper, lower, and left sides of the rear wall 6c.

The first front flange 6d is a tongue shaped piece formed by bending from the left end of the front wall 6b such as to extend forward. The first rear flange 6e is a tongue shaped piece formed by bending from the left end of the rear wall 6c such as to extend backward. The first front flange 6d and the first rear flange 6e are joined to the stiffener vertical wall 23b by welding.

The second front flange 6f is a tongue shaped piece formed by bending from the lower end of the front wall 6b such as to extend forward. The base end portion of the second front flange 6f and the base end portion of the first front flange 6d extend continuously from each other. The second rear flange 6g is a tongue shaped piece formed by bending from the lower end of the rear wall 6c to extend backward. The base end portion of the second rear flange 6g and the base end portion of the first rear flange 6e extend continuously from each other. The second front flange 6f and the second rear flange 6g are joined by spot welding to the upper surface of the stiffener lower wall 23c.

As shown in FIG. 4 and FIG. 5, the bulk upper wall 6h is a wall formed by extending horizontally on the vehicle outer side from the upper end of the inner side wall 6a. Two portions of the front end portion and the rear end portion of the bulk upper wall 6h are joined by spot welding to the stiffener upper wall 23a.

The third front flange 6i is a tongue shaped piece formed by bending from the upper end of the front wall 6b to extend backward. The third rear flange 6j is a tongue shaped piece formed by bending from the upper end of the rear wall 6c to extend forward. The third front flange 6i and the third rear flange 6j are joined by spot welding to the bulk upper wall 6h.

As shown in FIG. 9, the depressed portion 6k is formed in a shape depressed on the side of the rail stiffener 23 (toward the outer side direction in the vehicle transverse direction) at a position, on the inner side wall 6a, at which the depressed portion 6k and the division joint portions 21e lap with each other in the vehicle transverse direction. The front rail inner member 21A and the rear rail inner member 21B are arranged such as to overlap with each other, and thereby the division joint portion 21e of the rear rail inner member 21B is arranged in a state of having entered inside the depressed portion 6k even if the division joint portions 21e are thick. Thus, the depressed portion 6k is prevented from expanding on the vehicle inner side.

As shown in FIG. 3, the spot gun insertion holes 6m are holes for inserting the spot gun 7 (see FIG. 9) for spot joining of the stiffener vertical wall 23b of the rail stiffener 23 and the flange upper end portion 52Ba of the pillar stiffener 52B.

As shown in FIG. 9, as the rail stiffener 23 is joined to the vehicle outer side of the bulkhead 6 to form a closed cross-section 6q, the but shaped cross-section 6n can increase the strength of the rail stiffener 23. As the rail inner 21 is fastened to the vehicle inner side of the bulkhead 6 by bolt fastening, the but shaped cross-section 6n can increase the strength of the rail inner 21.

As shown in FIG. 3, the bolt insertion holes 6o, 6o are formed at positions that agree with the bolt insertion holes 52Ab, 52Ab of the pillar inner 52A and the bolt insertion holes 21b, 21b of the rear rail inner member 21B, and bolts 32 are inserted. In such a manner, the division joint portions 21e of the front rail inner member 21A and the rear rail inner member 21B are firmly connected.

As shown in FIG. 4, the lower flange 6p is an extending portion formed at the lower edge portion of the bulkhead 6, and is joined by spot welding to the lower flange 23g of the rail stiffener 23 at three portions thereof, namely the front end portion, the rear end portion, and the central portion.

In such a manner, the bulkhead 6 is joined to the rail stiffener 23 and is fastened to the rail inner 21 by the bolts 32 and nuts 31. Thus, the bulkhead 6 is attached between the rail inner 21 and the rail stiffener 23 at an intersection portion 2b where the pillar 5 and the roof side rail 2 intersect with each other. That is, as shown in FIG. 4, the pillar inner 52A, the rail inner 21, and the bulkhead 6 are fastened together by the bolts 32 and the nuts 31. In such a manner, the bulkhead 6 arranged inside the roof side rail 2 is, as shown in FIG. 8, disposed such as to partition the closed cross-section 2a between the rail inner 21 and the rail stiffener 23.

<Structures of Bolts and Nuts>

As shown in FIG. 8, the each bolt 32 is a fastening tool that is inserted from the vehicle inner side of the rail inner 21 through the pillar inner 52A, the rail inner 21, and the bulkhead 6 to be fastened to the corresponding nut 31. The bolt 32 is for example formed by a bolt, with a seat, having a male screw portion 32a.

The nut 31 and the bolt 32 attach the bulkhead 6 to the rail inner 21 side of the closed cross-section 2a formed by the rail inner 21 and the rail outer 22 such as to lap the bulkhead 6 with the rail inner 21 side. Accordingly, the bolt 32, the nut 31, and the bulkhead 6 have a function to increase the stiffness and the strength by suppressing the cross-section deformation of the closed cross-section 2a.

<Structure of Center Pillar>

As shown in FIG. 3, the center pillar 52 is a member that constructs a tube-shaped post that is one part of the vehicle body side part 1a and the vehicle body top part 1d. For example, the center pillar 52 is formed by pressing a steel plate or the like. The center pillar 52 (pillar 5) is provided with the pillar inner 52A whose upper end is attached to the vehicle inner side surface of the rail inner 21 and the pillar stiffener 52B whose upper end is attached to the vehicle outer side surface of the rail stiffener 23.

The pillar inner 52A forms a tube shaped closed cross-section, for example, by joining a center pillar outer (not shown) and the pillar stiffener 52B. The upper portion of the pillar inner 52A is provided with the above-described bolt insertion holes 52Ab and the above-described flange upper end portion 52Aa. The vehicle inner side of the pillar inner 52A is covered by a pillar garnish (not shown), which is an interior material.

The pillar stiffener 52B is a reinforcing member for reinforcing the center pillar 52. The pillar stiffener 52B is interposed between the pillar inner 52A, which is formed in a tube shape and extending downward from the roof side rail 2, and a pillar outer (not shown), which are joined with each other by spot welding or the like for integration. The front-rear upper side peripheral edge of the upper end portion 52Bb of the pillar stiffener 52B is provided with the flange upper end portion 52Ba joined by spot welding or the like to the rail stiffener 23.

<Action of Top Part Structure of Vehicle Body>

In the following, referring to the attached drawings, the action of the top part structure of a vehicle body in the present embodiment according to the invention will be described in the order of attaching.

As shown in FIG. 3, in case of attaching the rail inner 21 and the rail stiffener 23 to the upper portion of the center pillar 52, to which the pillar inner 52A and the pillar stiffener 52B are joined, first, the nuts 31, 31 are fixed by projection welding to the vehicle outer side of the bolt insertion holes 6o, 6o of the bulkhead 6. Then, as shown in FIG. 4, the bulkhead 6 is inserted under the stiffener upper wall 23a of the rail stiffener 23.

Then, making the fixed side electrode 8 (see FIG. 9) of a welding device touch the pillar stiffener 52B, the spot gun 7 (see FIG. 9) of the welding device is pressed against the bulkhead 6 from the vehicle inner side. Thus, the central portions of the first front flange 6d, the first rear flange 6e, and the lower flange 6p of the bulkhead 6, the stiffener vertical wall 23b, and the lower flange 23g of the rail stiffener 23 are joined.

Subsequently, the fixed side electrode 8 (see FIG. 9) of the welding device is made touch the stiffener lower wall 23c from under the rail stiffener 23; as shown in FIG. 6, the spot gun 7 (see FIG. 9) is inserted into the cut-out portions 23d, 23e of the rail stiffener 23 from the upper side; and the second front flange 6f and the second rear flange 6g of the bulkhead 6 and the stiffener lower wall 23c of the rail stiffener 23 are joined. Further, the bulk upper wall 6h of the bulkhead 6 and the stiffener upper wall 23a of the rail stiffener 23 are joined.

In such a manner, as shown in FIG. 4, the bulkhead 6 is joined to the rail stiffener 23.

Then, as shown in FIG. 4, the pillar stiffener 52B is disposed on the vehicle outer side of the rail stiffener 23. Then, the fixed side electrode 8 (see FIG. 9) of the welding device is made touch the pillar stiffener 52B from the vehicle outer side; the spot gun 7 (see FIG. 9) is inserted into the spot gun insertion holes 6m, 6m from the vehicle inner side; and the stiffener vertical wall 23b of the rail stiffener 23 and the upper end portion 52Bb (see FIG. 3) of the pillar stiffener 52B are joined.

Further, the fixed side electrode 8 (see FIG. 9) of the welding device is made touch the pillar stiffener 52B from the vehicle outer side; and the spot gun 7 (see FIG. 9) is pressed against the bulkhead 6 from the vehicle inner side so that the front-rear end portions of the lower flange 6p of the bulkhead 6, the lower flange 23g of the rail stiffener 23, and the flange upper end portion 52Ba (see FIG. 3) of the pillar stiffener 52B are joined.

In such a manner, as shown in FIG. 4, the bulkhead 6, the rail stiffener 23, and the pillar stiffener 52B are joined and integrated.

Then, as shown in FIG. 3 and FIG. 4, the protrusion portions 21f of the rail inner 21 are inserted into the cut-out portions 23d-23f of the rail stiffener 23, and the rail inner 21 and the rail stiffener 23 are matched with each other to be positioned. Then, as shown in FIG. 8, the rail inner 21 and the bulkhead 6 are disposed on the lower side of the stiffener upper wall 23a of the rail stiffener 23.

Further, as shown in FIG. 3, the bolt insertion holes 6o, 6o of the bulkhead 6, the bolt insertion holes 21b, 21b of the front rail inner member 21A and the rear rail inner member 21B, and the bolt insertion holes 52Ab, 52Ab of the pillar inner 52A are matched with each other. Accordingly, the bulkhead 6 is disposed on the vehicle outer side of the rail inner 21, and the pillar inner 52A is disposed on the vehicle inner side of the rail inner 21.

Subsequently, the bolts 32, 32 are inserted through the bolt insertion holes 52Ab, 52Ab of the pillar inner 52A, the bolt insertion holes 21b, 21b of the rail inner 21, and the bolt insertion holes 6o, 6o of the bulkhead 6 to be fastened to the nuts 31. Thus, as shown in FIG. 8, the pillar inner 52A, the rail inner 21, and the bulkhead 6 are fixed by the bolts 32 and the nuts 31.

Further, as shown in FIG. 8, the roof rail 12, the roof panel 11, and the outer upper flap portion 22a of the rail outer 22 are joined to the upper side of the stiffener upper wall 23a of the rail stiffener 23. The outer lower flap portion 22d of the rail outer 22 is joined to the flange upper end portion 52Ba of the pillar stiffener 52B.

In such a manner, the bulkhead 6 is joined to the vehicle inner side of the rail stiffener 23 and the upper end portion 52Bb of the pillar stiffener 52B and is fastened with bolts to the vehicle outer side of the rail inner 21 and the pillar inner 52A. Thus, it is possible to increase the stiffness and the strength of the intersection portion 2b (see FIG. 3) between the roof side rail 2 and the intersection portion 2b (see FIG. 3).

The roof side rail 2 formed in such a manner is, as shown in FIG. 8, provided with the closed cross-section 2a formed by the rail inner 21 and the rail outer 22, and further provided with, in the closed cross-section 2a, a closed cross-section 2a formed by the rail inner 21 and the rail stiffener 23. Accordingly, the stiffness and the strength of the roof side rail 2 can be increased.

In the closed cross-section 2a formed by the rail inner 21 and the rail stiffener 23, the bulkhead 6 is fixed by the bolts 32 and the nuts 31, and the rail inner 21 is thereby reinforced.

Further, as shown in FIG. 9, the opening portion on the vehicle outer side of the bulkhead 6 having the but shaped cross-section 6n is closed by the rail stiffener 23, and the closed cross-section 6q is thereby formed. Accordingly, the stiffness and the strength of the intersection portion 2b of the roof side rail 2 can be further increased.

As the nuts 31 screw-engaged to the bolts 32 are arranged in the bulkhead 6 disposed in the rail stiffener 23, the appearance shape of the rail outer 22, the layout for installing the rail outer 22, and the like are not affected. Accordingly, the designability of the rail outer 22 can be improved.

Modified Example

Incidentally, it is needless to say that the present invention is not limited to the foregoing embodiment, and various modifications and changes can be made within the scope of the technical ideas of the invention.

In the foregoing embodiment, although the left side part of the vehicle body top part where the roof side rail 2 and the center pillar 52 are joined was described as an example of the present invention, the invention is not limited thereto. For example, it is also possible to apply the invention to joint parts between pillars 5 such as the front pillar 51, the quarter pillar 53, the rear pillar 54 and the like, and the roof side rail 2.

Further, the attaching order and the welding process described in the foregoing embodiment are an example, and works may be carried out in a different order. For example, the bulkhead 6, the rail stiffener 23, and the pillar stiffener 52B may be joined together in the same process.

DESCRIPTION OF REFERENCE SYMBOLS

1: vehicle body
1*a*: vehicle body side part
2: roof side rail
2*a*: closed cross-section
2*b*: intersection portion
5: pillar
6: bulkhead
6*a*: inner side wall
6*b*: front wall
6*c*: rear wall
6*d*: first front flange
6*e*: first rear flange
6*f*: second front flange
6*g*: second rear flange
6*h*: bulk upper wall
6*i*: third front flange
6*j*: third rear flange
6*k*: depressed portion
6*m*: spot gun insertion hole
6*n*: but shaped cross-section
7: spot gun
21: rail inner
21A: front rail inner member
21B: rear rail inner member
21*e*: division joint portion
22: rail outer
23: rail stiffener
23*a*: stiffener upper wall
23*b*: stiffener vertical wall
23*c*: stiffener lower wall
23*d*, 23*e*: cut-out portion
31: nut
32: bolt
52: center pillar
52A: pillar inner
52B: pillar stiffener
R1: vehicle compartment

The invention claimed is:

1. A vehicle body comprising:
a roof side rail extending in a front-rear direction on a side part of the vehicle body, the roof side rail being formed by a rail inner, a rail outer joined to a vehicle outer side of the rail inner to form a cross-section, and a rail stiffener sandwiched between the rail inner and the rail outer to partition the closed cross-section; and
a pillar extending downward from the roof side rail, a top part structure of the vehicle body including:
a bulkhead joined, at an intersection portion between the pillar and the roof side rail, to the rail stiffener, fastened by a bolt to the rail inner, and disposed so as to partition the closed cross-section between the rail inner and the rail stiffener,
wherein the bulkhead has a cap-shaped cross-section formed by:
an inner side wall fastened to the rail inner;
a front wall extending from a front end of the inner side wall to a vehicle outer side;
a rear wall extending from a rear end of the inner side wall to the vehicle outer side;
a first front flange extending forward from the front wall; and
a first rear flange extending backward from the rear wall.

2. The vehicle body according to claim 1, wherein the rail stiffener has a U-shaped cross-section formed by:
a stiffener upper wall formed at an upper portion of the rail stiffener;
a stiffener vertical wall extending downward from an outer side end portion in a vehicle transverse direction of the stiffener upper wall; and
a stiffener lower wall extending from a lower end of the stiffener vertical wall to a central side in the vehicle transverse direction,
wherein the bulkhead includes:
a second front flange extending forward from a lower end of the front wall and joined to the stiffener lower wall; and
a second rear flange extending backward from a lower end of the rear wall and joined to the stiffener lower wall, and
wherein the first front flange and the first rear flange are joined to the stiffener vertical wall.

3. The vehicle body according to claim 2, wherein the rail stiffener is provided with cut-out portions on the stiffener upper wall thereof, at parts corresponding to the second front flange and the second rear flange, the cut-out portions enabling insertion of a spot gun.

4. The vehicle body according to claim 2,
wherein the bulkhead includes:
a bulk upper wall extending from an upper end of the inner side wall to a vehicle transverse outer side;
a third front flange extending backward from an upper end of the front wall and joined to the bulk upper wall; and
a third rear flange extending forward from an upper end of the rear wall and joined to the bulk upper wall.

5. The vehicle body according to claim 1,
wherein the rail inner is divided front and rear to form a front rail inner member and a rear rail inner member and includes a division joint portion at which a rear end of the front rail inner member and a front end of the rear rail inner member are joined, and
wherein the division joint portion is disposed at a position where the division joint portion is lapped with the bulkhead in the vehicle transverse direction.

6. The vehicle body according to claim 5, wherein the inner side wall of the bulkhead includes a depressed portion at a position at which the depressed portion is lapped with the division joint portion in the vehicle transverse direction, the depressed portion being in a shape depressed toward a vehicle outer side in the vehicle transverse direction.

7. The vehicle body according to claim 1,
wherein the pillar includes a pillar inner, an upper end of said pillar inner is attached to a vehicle inner side surface of the rail inner, and
wherein the pillar inner, the rail inner, and the bulkhead are fastened together by a bolt.

8. The vehicle body according to claim 1,
wherein the pillar includes a pillar stiffener, an upper end of said pillar inner is attached to a vehicle outer side surface of the rail stiffener, and
wherein the bulkhead includes a spot gun insertion hole for spot joining of the rail stiffener and the pillar stiffener.

* * * * *